Aug. 11, 1931.  J. W. MARSEY  1,818,414
SHOCK ABSORBER
Filed Aug. 31, 1929    2 Sheets-Sheet 2
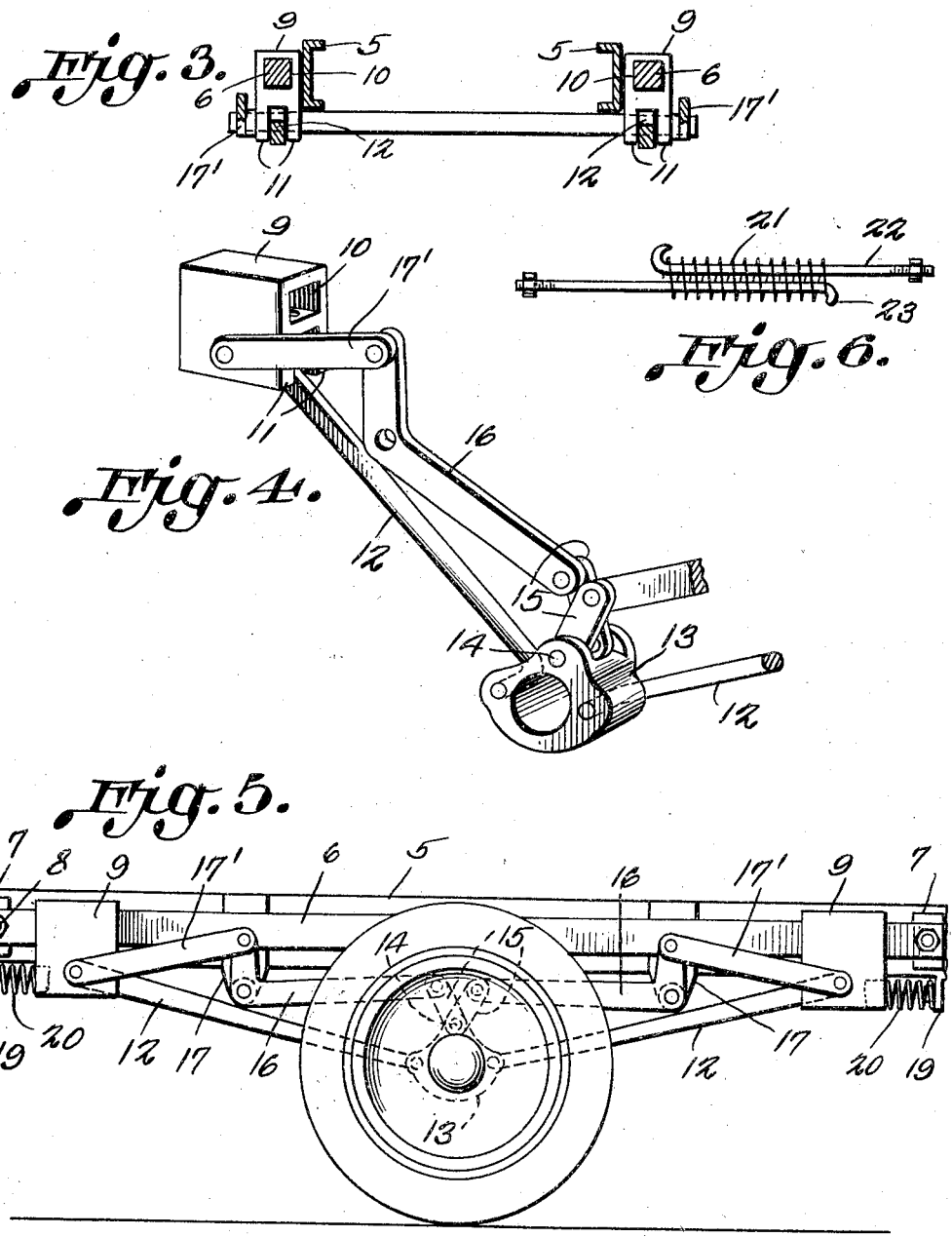
J. W. Marsey
Inventor Patented Aug. 11, 1931

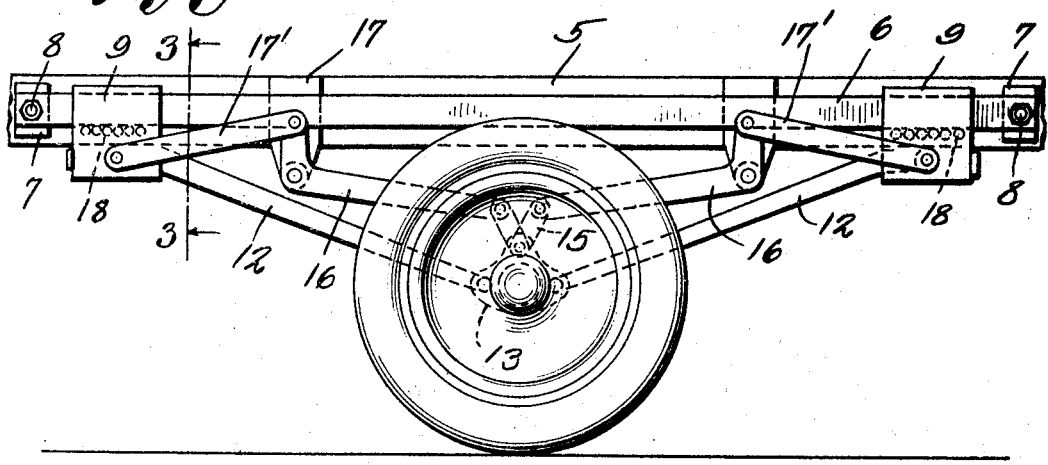
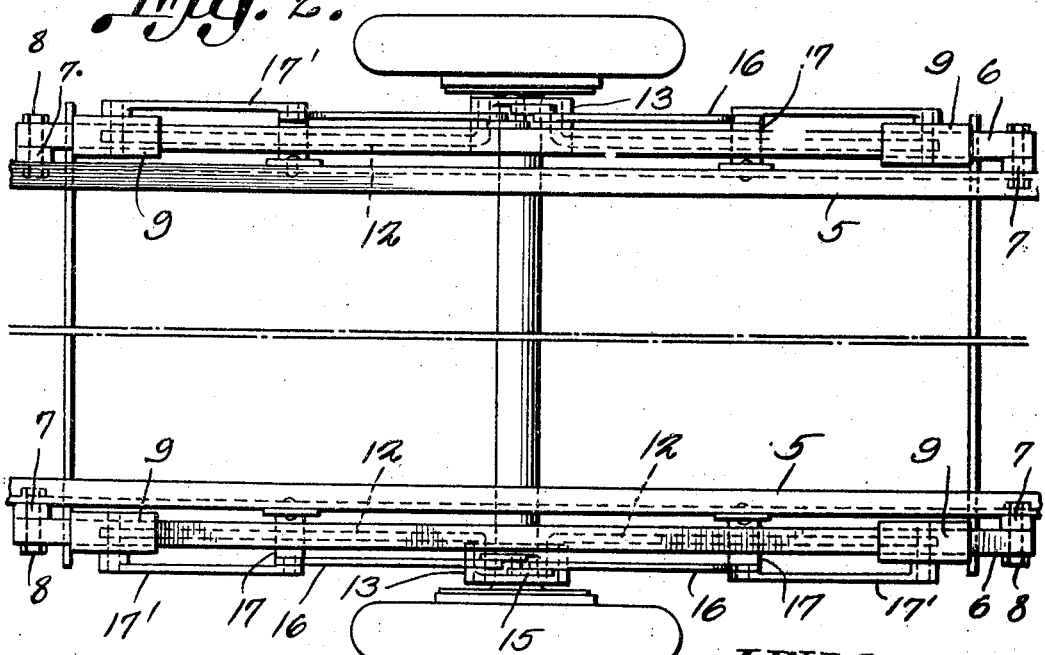

1,818,414

UNITED STATES PATENT OFFICE

JAMES W. MARSEY, OF LEAVENWORTH, KANSAS

SHOCK ABSORBER

Application filed August 31, 1929. Serial No. 389,804.

This invention relates to shock absorbers for use in connection with motor vehicles, the primary object of the invention being to provide means to relieve the running gear of undue strain when the motor vehicle is passing over irregularities in a road surface, and at the same time enhance the riding qualities of the vehicle.

An important object of the invention is to provide a device of this character which may be readily installed on motor vehicles, eliminating the necessity of making extensive alterations in the vehicle construction.

A still further object of the invention is the provision of a device which will distribute the strain directed to the chassis of the vehicle longitudinally of the side rails of the chassis, when the vehicle is passing over rough road surfaces.

With the foregoing and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 1 is a side elevational view of a vehicle chassis illustrating a device constructed in accordance with the invention, as installed thereon.

Figure 2 is a plan view thereof.

Figure 3 is a sectional view taken on line 3—3 of Figure 1.

Figure 4 is a perspective view illustrating one end of the device.

Figure 5 is an elevational view illustrating the device as in its expanded position.

Figure 6 is an elevational view illustrating a modified form of spring used with the device.

Referring to the drawings in detail, the reference character 5 designates the side rails of the chassis of a motor vehicle, to which the bars 6 are secured, the bars 6 being held in spaced relation with the side rails by means of the block 7 disposed at the ends thereof, and through which the securing bolts 8 extend.

The bars 6 which are secured to the outer sides of the side rails 5, provide tracks for the slides 9 that are in the form of blocks having openings 10 that receive the bars 6. As shown, each block is provided with spaced flanges 11, between which the upper ends of the rods 12 are pivotally mounted.

The opposite ends of the rods 12 are extended laterally and fit within openings formed in the collar 13 mounted on the axle of the vehicle with which the device is used, and with which the rods 12 are associated. Spaced ears extend upwardly from the collars 13 and are provided with openings to receive the bolts 14 on which the links 15 are mounted, the upper ends of the links 15 being connected with the bell crank levers 16 that are pivotally mounted at the lower ends of the brackets 17 which are secured to the side rails 5.

Links 17' connect the upper ends of the bell crank levers 16 to the slides 9 so that movement of the bell crank levers will be transmitted to the slides 9 to move the slides 9 longitudinally of the bars 6. Ball bearings 18 are fitted in the slides and engage the lower edges of the bars 6 to insure the free operation of the slides.

Extending downwardly from the ends of the bars 6, are flanges 19 to which the springs 20 are secured, the opposite ends of the springs resting in sockets formed in the slides 9, as clearly shown by the drawings. Thus it will be obvious that as the slides move laterally, the springs 20 are compressed, restricting movement of the slides to allow gradual movement of the vehicle body with respect to the axle, or vice versa.

In the form of spring shown by Figure 6 of the drawings, a single spring such as indicated at 21 is provided, the same being positioned over the rods 22 that have hooks 23 formed at their outer ends, which hooks provide stops for the spring so that movement of the rods 22 in opposite directions will act to compress the spring.

It is of course understood that the rods will be connected to the members 19 and slides 9 to the end that the spring 21 will act in the same capacity as the springs 20.

I claim:

In combination with the chassis and axle of a motor vehicle, a shock absorbing device comprising a track bar secured to the side of a vehicle, slides having openings to receive the bar, and having their lower sides cut away, rods having one of their respective ends pivotally mounted within the cut away sides of the slides, a collar mounted on the axle of the vehicle, said rods being connected with the collar, bell crank levers connected with the chassis, links connecting the bell crank levers to the slides, links connecting the bell crank levers and the collar, flanges extending downwardly from the chassis, and coiled springs held between the slides and the flanges to restrict movement of the slides.

In testimony that I claim the foregoing as my own, I have hereto affixed my signature.

JAMES W. MARSEY.